May 12, 1964
L. JOSEPH
3,132,402
TWO PIECE CLAMP
Filed Dec. 15, 1961
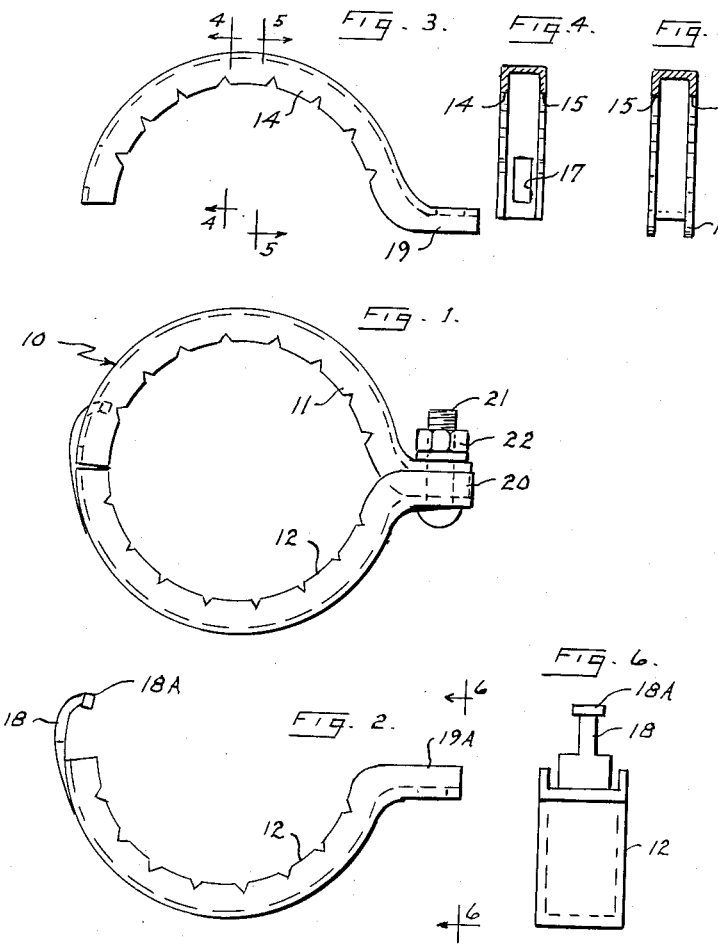
INVENTOR.
LOUIS JOSEPH
BY Howard J. Jeandron
AGENT

United States Patent Office 3,132,402
Patented May 12, 1964

3,132,402
TWO PIECE CLAMP
Louis Joseph, Brooklyn, N.Y. (% Sturdy Products Corp., 130 New York Ave., Jersey City 7, N.J.)
Filed Dec. 15, 1961, Ser. No. 159,594
1 Claim. (Cl. 24—284)

This invention relates to a two-piece clamp, and more particularly to the formation of a clamp that is formed with two semi-circular bands that are interconnected to form an exact internal diameter.

Clamping bands of the general type shown in this application are not new in the art, there are a great many that are comprised of a similar configuration; that is a circular form that may be made up of a single band or a two-piece band, and with the one-piece bands it is simply a matter of a means to fasten the loose ends together to provide the clamping action, and with the two-piece bands, it is a matter of clamping both ends of the semi-circular pieces together to form the circular band.

It is an object of this invention to provide a clamping band in which there are two semi-circular pieces and in which one end of each piece is provided with an interlocking means and in which the opposed ends are provided with apertures to permit drawing said ends together with a bolt or similar device to form a clamp having a predetermined internal chamber.

A further object of this invention is to provide a clamping band in which there are two semi-circular pieces and in which one end of each piece is provided with an interlocking means and in which the opposed ends are provided with apertures to permit drawing said ends together with a bolt or similar device, and in which the internal periphery of said clamping band is provided with a plurality of cut out portions in the bearing surface to permit a degree of yield in the clamping operation.

Further objects of this invention shall be apparent by reference to the accompanying detailed description and the drawings, in which:

FIG. 1 is a plan view of the clamp,
FIG. 2 is a plan view of the lower half of the clamp,
FIG. 3 is a plan view of the upper half of the clamp,
FIG. 4 is a cross sectional view taken on line 4—4 of FIG. 3,
FIG. 5 is a cross sectional view taken on line 5—5 of FIG. 3, and
FIG. 6 is an end view taken on line 6—6 of FIG. 2.

Referring to the drawings, there is illustrated a clamp 10 that is formed circular to provide a clamping action over approximately 360°. This type of clamp is primarily provided for automobile mufflers, to clamp the pipe at either end of the muffler in a tight fitting relation with the muffler. Various types of clamps have been used for this particular installation and there have been so many weaknesses or undesirable features that this clamp is designed to overcome these weaknesses and undesirable features.

Referring to FIG. 4, a cross section of the web of the half 11 of the clamp is illustrated; both halves are formed in this U shape, and the cross section or gauge is sufficiently strong to withstand the intended stresses. It is to be noted that it is the open end of the inverted U-shaped web that actually bears against the pipe or element to be encompassed by this clamp. Thus, the edges 14 and 15 will be the bearing surfaces. Clamp 10 is composed of two halves, 11 and 12, which are generally identical except that the half 11 is narrower in cross section than the half 12 so that the one end of the half 11 will fit into and nest within the U-shaped end of the half 12. The opposite end of the clamp is formed to provide an interlocking relation. Thus the half 11, as shown in FIG. 4, is provided with an aperture 17 at one end thereof, while the half 12 is provided with a hook shaped end 18, the hook element 18 is formed of a width less than the width of the upper half of the clamp to fit the width of the aperture 17. The hook shaped end 18 is turned inward and the hooked end is generally T-shaped as illustrated in FIG. 6. This end 18 and slot 17 of the opposite half provide the means to join the two halves 11 and 12 as shown in FIG. 1. The opposite ends of each half are formed as straight flanges 19 and 19A and are similar (except for width). The flanges 19 and 19A are provided with apertures 20 to permit a bolt 21 to be passed therethrough and a nut 22 threadably secured to the bolt 21 to draw the flanges 19 and 19A into their nested parallel relation in the maximum closed position.

It is apparent that when the clamp is in the closed position as illustrated in FIG. 1, that the edges 14 and 15 (FIG. 4) of each half 11 and 12 will provide a bearing or squeezing surface. When the clamp is applied, if the clamp is provided with a straight wall, as shown in FIG. 1, there will be a contact with the circular surface of slightly less than 360°, and as the pressure increases with the tightening of the nut 22, pulling flanges 19 and 19A together, there must be a slight movement of the two halves 11 and 12 toward each other and an adjustment of the contact with the surface of the tube inserted therein. It has been found that if the walls of the U-shaped web are cut out with small V-shaped cuts, as shown in FIGS. 2 and 3, there is a better adjustment of the clamp to the periphery of the tube, and, in addition, as the maximum pressure is induced, the cut out portions permit a slight yield or drawing in of the clamp without moving the surfaces that are then in contact; this slight yield permits a much greater pressure being induced in the final stages of clamping. It is to be noted that the half 11 of the clamp 10, FIGS. 4 and 5, is narrower in width than the half 12, FIG. 6. This is to permit the end 19 to fit between the walls of the U-shaped end 19A in a nested relationship as shown in FIG. 1. This provides a great deal more rigidity to the clamp in its final positioning. It is also to be noted that the T-shaped end 18A is of a width to fit between the walls of the U-shaped half 11 of the clamp 10. This also assists in providing greater rigidity to the clamp. With the hook shaped end 18 formed as shown, it is necessary to turn the half 12 at 90° to the half 11 to insert the T-shaped end 18A through the elongated slot 17 then the half 12 may be turned to be in alignment with the half 11 as shown in FIG. 1. The bolt 21 may then be passed through the apertures 20 and the nut 22 affixed as shown to fasten the clamp as illustrated in FIG. 1. With the clamp so affixed, the T-shaped end or head 18A positioned between the flanges of the half 11 prevents twisting of the clamp and with the end 19 of half 11 nested between the flanges of the end 19A of half 12 there is a great deal of rigidity provided to the clamp to prevent any twisting or any misalignment.

The clamp 10, being formed from a heavy gauge material, is intended to provide a very exact fit, that is, in the tightly closed position illustrated in FIG. 1, the clamp is intended to provide an exact inside diameter and it cannot be closed or provided to give a clamping action less than this diameter. The reason for providing this limitation is to prevent the actual crushing of the clamped pipe, such as the tailpipe of an automobile; a tight fit of the tailpipe with the muffler may be attained with this clamp without crushing the pipe. Because of this feature, the clamp 10 is made in a variety of sizes. It is the inside diameter of the clamp that must fit the exact required outside diameter of the pipe with which it is to be used. It is to be noted in the manufacture of these clamps that the completed clamp 10 shown in FIG. 1 is actually fitted to a perfect mandril to insure the exact inside diameter of each and every clamp.

It is apparent that the clamp 10 disclosed in this application may be formed with a U-shaped cross section; however, this should not be construed as a limitation, as the cross section may be a solid band with the ends formed as shown in the present embodiment or of a different cross section, as long as there are two protruding edges 14 and 15 to provide the actual bearing contact. It is also apparent in this clamp that although the two halves 11 and 12 have been joined at one end by means of a hook shaped element 18 and a slot 17, any similar type of connecting element or elements may be used without departing from the spirit of this invention, and it is apparent that although the opposite side of the clamp has been constructed with a pair of flanges 19 and 19A and a bolt 21 to pull the flanges together, it is understood that any similar type of fastening element may be utilized without departing from the spirit of this invention, and it is understood that although the side webs of the U-shaped element have been provided with V-shaped cut out portions, the web may be simply provided with slits of any form to permit a slight degree of yield, without departing from the spirit of this invention, and although one means of retaining both halves in alignment has been shown, other means may be employed without departing from the spirit of this invention and this invention shall be limited only by the appended claim.

What is claimed is:

A two piece circular clamp in which each half is formed generally semi-circular, and in a generally U cross section, with a closed end and two flanges, one half being narrower and the other half being wider in cross sectional width, the U cross sections positioned with the closed end outward to form the outside circumference of the clamp and the edge of the flanges forming a gripping circumference, the narrower half being provided with a flanged radial extension at one end and having a perforation through the base of the U cross section on the opposite end, the wider half being provided with a similar flanged radial extension on one end and a hook shaped element on the opposite end, said hook shaped element being formed to fit into the perforation through the end of the opposite half to engage the two halves in a hinged abutting relationship, the extension of the narrower half mating with and fitting between the flanges of the extension of the wider half so that said flanges of said extension of said narrower half abut with the base of the extension of the wider half in the fully closed position to provide a predetermined internal diameter and a fastening means being provided to hold said flanges in this abutting relationship.

References Cited in the file of this patent
UNITED STATES PATENTS

| | | |
|---|---|---|
| 519,312 | Arthur | May 18, 1894 |
| 727,707 | Stauffer et al. | May 12, 1903 |
| 1,189,404 | Stulp | July 4, 1916 |
| 1,447,956 | Blaise | Mar. 13, 1923 |
| 2,897,569 | Kastner | Aug. 4, 1959 |
| 2,994,499 | Waters | Aug. 1, 1961 |
| 3,006,663 | Bowne | Oct. 31, 1961 |

FOREIGN PATENTS

| | | |
|---|---|---|
| 2,788 | Great Britain | of 1913 |